US010641148B2

(12) United States Patent
Korenaga

(10) Patent No.: US 10,641,148 B2
(45) Date of Patent: May 5, 2020

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Shingo Korenaga, Shizuoka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/124,843

(22) Filed: Sep. 7, 2018

(65) Prior Publication Data
US 2019/0112957 A1 Apr. 18, 2019

(30) Foreign Application Priority Data
Oct. 17, 2017 (JP) .................. 2017-201363

(51) Int. Cl.
F01N 3/28 (2006.01)
F01N 3/20 (2006.01)
F01N 13/18 (2010.01)

(52) U.S. Cl.
CPC ......... F01N 3/2013 (2013.01); F01N 3/2853 (2013.01); F01N 3/2867 (2013.01); F01N 13/1844 (2013.01); F01N 13/1805 (2013.01); F01N 2350/04 (2013.01)

(58) Field of Classification Search
None
See application file for complete search history.

(56) References Cited

U.S. PATENT DOCUMENTS

2012/0011834 A1  1/2012 Sobue
2014/0212340 A1* 7/2014 Saiki ............... F01N 3/0211
                                                       422/179
2016/0115842 A1  4/2016 Mutsuda et al.

FOREIGN PATENT DOCUMENTS

JP  2007-205307 A   8/2007
JP  2012-021488     2/2012
JP  2015-098834     5/2015
JP  2016-084776     5/2016

OTHER PUBLICATIONS

Office Action issued in U.S. Appl. No. 16/714,096, dated Mar. 19, 2020.

* cited by examiner

Primary Examiner — Walter D. Griffin
Assistant Examiner — Jelitza M Perez
(74) Attorney, Agent, or Firm — Finnegan, Henderson, Farabow, Garrett & Dunner, LLP

(57) ABSTRACT

An exhaust gas control apparatus for an internal combustion engine includes an outer tube, a downstream side catalyst held in the outer tube via a first mat, and an electric heating catalyst held in the outer tube via a second mat upstream of the downstream side catalyst. A joint of the first mat is disposed in a place other than a vertically lowermost portion.

2 Claims, 3 Drawing Sheets

EXHAUST GAS CONTROL APPARATUS FOR INTERNAL COMBUSTION ENGINE

INCORPORATION BY REFERENCE

The disclosure of Japanese Patent Application No. 2017-201363 filed on Oct. 17, 2017 including the specification, drawings and abstract is incorporated herein by reference in its entirety.

BACKGROUND

1. Technical Field

The disclosure relates to an exhaust gas control apparatus for an internal combustion engine.

2. Description of Related Art

An exhaust gas control apparatus carrying a catalyst capable of controlling exhaust gas is disposed on a path of an exhaust pipe so that hazardous substances contained in the exhaust gas emitted from an internal combustion engine are removed. A temperature of the catalyst needs to be maintained at a temperature suitable for catalyst activation (hereinafter, referred to as a "catalyst activation temperature") so that the efficiency of a hazardous substance removal by the catalyst is enhanced.

However, a temperature of the exhaust gas is relatively low immediately after operation initiation, and thus it takes time for the catalyst temperature to reach the activation temperature. There is room for improvement in this regard.

Japanese Unexamined Patent Application Publication No. 2012-21488 (JP 2012-21488 A) discloses an exhaust gas control apparatus provided with an electric heating catalyst that can be heated by energization. In addition, according to JP 2012-21488 A, a downstream side catalyst portion is disposed downstream of the electric heating catalyst.

SUMMARY

The electric heating catalyst applies a high voltage, and thus insulation from a conductive exhaust pipe is needed. Conceivable in this regard is holding the electric heating catalyst and the downstream side catalyst in an exhaust passage via, for example, an insulated mat (hereinafter, simply referred to as the "mat").

The exhaust gas, in the meantime, contains moisture and carbon as conductive substances. Accordingly, an electric leakage path leading to the conductive exhaust pipe from the electric heating catalyst (hereinafter, simply referred to as the "electric leakage path") is formed due to carbon deposition to the insulated portion and the mat containing moisture. As a result, electric leakage may occur during energization of the electric heating catalyst.

The disclosure provides an exhaust gas control apparatus for an internal combustion engine with which electric leakage path formation attributable to condensed water can be prevented or further suppressed.

An aspect of the disclosure relates to an exhaust gas control apparatus disposed on an exhaust passage of an internal combustion engine and configured to control exhaust gas. The exhaust gas control apparatus includes an outer tube having an electrical insulation property connected to an exhaust pipe having an electrical conductive property, an electric heating catalyst positioned inside the outer tube, and a downstream side catalyst arranged downstream of the electric heating catalyst in an exhaust flow direction in the outer tube. The downstream side catalyst is held inside the outer tube via a first mat. A joint of the first mat is disposed in a place other than a vertically lowermost portion of the first mat in the outer tube.

It has been found that, in an exhaust gas control apparatus for an internal combustion engine as described above, an electric leakage path leading to an exhaust pipe from an electric heating catalyst may be formed due to carbon deposition to an insulated portion and a mat containing moisture. From a manufacturing viewpoint, the mat holding a downstream side catalyst has a joint. It has been found that water is likely to accumulate in the vertically lower portion of the downstream side catalyst, and thus the electric leakage path is likely to be formed in the mat when the joint of the mat is positioned in the vertically lower portion.

In the exhaust gas control apparatus described above, the joint of the first mat holding the downstream side catalyst is disposed to be positioned above the vertically lowermost portion (in a position other than the vertically lowermost portion) in the outer tube. In the electric heating catalyst configured as described above, the joint is disposed to avoid a position where water is likely to accumulate. As a result, electric leakage path formation can be further suppressed, and the occurrence of electric leakage during energization of the electric heating catalyst can be further suppressed.

In the exhaust gas control apparatus according to the aspect, the joint of the first mat may be disposed in a position other than a vertically lower portion that is positioned below the downstream side catalyst.

Water may accumulate in the vertically lower portion positioned below the downstream side catalyst. In the exhaust gas control apparatus according to the aspect of the disclosure, the joint is disposed to avoid a position where water may accumulate, and thus electric leakage path formation is more reliably suppressed.

In the exhaust gas control apparatus according to the aspect, the joint of the first mat may be disposed in a vertically uppermost portion of the first mat in the outer tube.

In the above-described configuration, the joint is disposed at a position farthest from a position where water is likely to accumulate, and thus electric leakage path formation is more reliably suppressed.

In the exhaust gas control apparatus according to the aspect, the electric heating catalyst may be held in the exhaust passage via a second mat and a joint of the second mat may be disposed in a position other than the vertically lowermost portion of the second mat in the outer tube.

The electric heating catalyst positioned upstream of the downstream side catalyst is also held by the second mat that has the joint. When the joint of the second mat is positioned in the vertically lowermost portion, water is likely to reach the downstream side catalyst through the joint of the first mat.

In the above-described configuration, the joint of the second mat is disposed in a place other than the vertically lowermost portion, and thus outflow of water to the downstream side catalyst through the joint of the second mat can be further suppressed. As a result, electric leakage path formation in the first mat can be further suppressed.

According to the aspect of the disclosure, electric leakage path formation on the mat attributable to condensed water can be further suppressed. As a result, the occurrence of electric leakage during energization of the electric heating catalyst can be prevented or further suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, specific embodiments to which the disclosure is applied will be described in detail with reference to accompanying drawings. The disclosure is not limited to the following embodiments. The following description and the drawings are appropriately simplified so that the description is clarified.

First Embodiment

Figure 1:
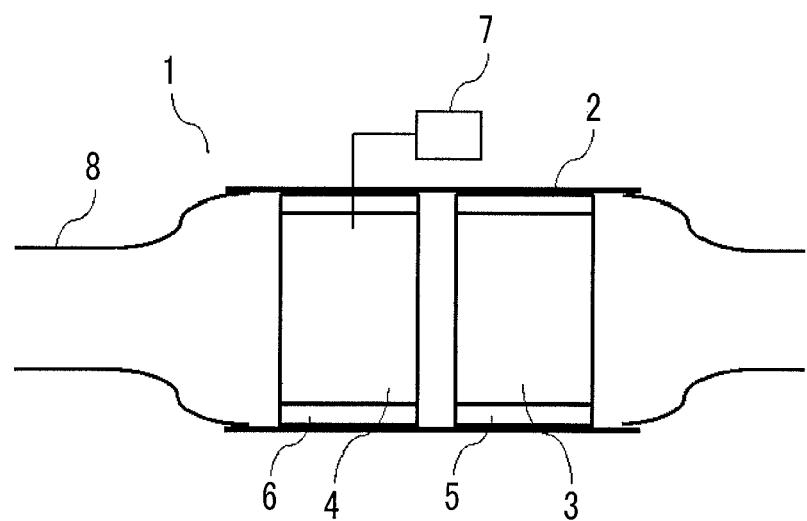
FIG. 1 is a schematic configuration diagram of an exhaust gas control apparatus for an internal combustion engine according to an embodiment of the disclosure.

FIG. 1 is a schematic configuration diagram of an exhaust gas control apparatus 1 for an internal combustion engine (hereinafter, referred to as the "exhaust gas control apparatus 1"). The exhaust gas control apparatus 1 is disposed on an exhaust passage so that exhaust gas from a combustion chamber is controlled. The exhaust gas control apparatus 1 is provided with an outer tube 2, a downstream side catalyst 3, an electric heating catalyst 4, a first mat 5, and a second mat 6. The outer tube 2 has an electrical insulation property. The outer tube 2 is connected to a exhaust pipe 8 that has an electrical conductive property. The exhaust gas control apparatus according to a first embodiment is disposed on the exhaust passage of an internal combustion engine constituting a hybrid system that has the internal combustion engine and an electric motor as a vehicle drive source. Internal combustion engines to which the exhaust gas control apparatus is applied are not necessarily limited to the internal combustion engine constituting the hybrid system.

The electric heating catalyst 4 is held in the outer tube 2. The electric heating catalyst 4 is connected to an electric power source 7 and is heated by generating heat by energization. Specifically, the electric heating catalyst 4 is configured to have a base material generating heat by energization and a metal catalyst. The base material generating heat by energization is formed of a material generating heat by energization and is capable of circulating exhaust gas. A nonmetal material that can be heated by energization or a porous body with a cell structure that is formed of a metal material can be applied to the base material generating heat by energization. The porous body may have a regular cell structure or may have an irregular cell structure. The metal catalyst is carried on the surface of the base material generating heat by energization. A suitable metal may be applied to the metal catalyst.

The downstream side catalyst 3 is held downstream of the electric heating catalyst 4 in the outer tube 2. The downstream side catalyst 3 has insulating properties. Specifically, the downstream side catalyst 3 is a three-way catalyst. Another type of catalyst may be applied to the downstream side catalyst instead. The downstream side catalyst 3 is held in the outer tube 2 via the first mat 5. The electric heating catalyst 4 is held in the outer tube 2 via the second mat 6. The first mat 5 and the second mat 6 are holding members and have insulating properties. The total length of the first mat 5 is set in accordance with the total length of the downstream side catalyst 3. The total length of the second mat 6 is set in accordance with the total length of the electric heating catalyst 4. A ceramic fiber mat (such as an alumina mat) can be applied to the first mat 5 and the second mat 6. Another material may be applied to the first mat 5 and the second mat 6 instead.

Figure 2:
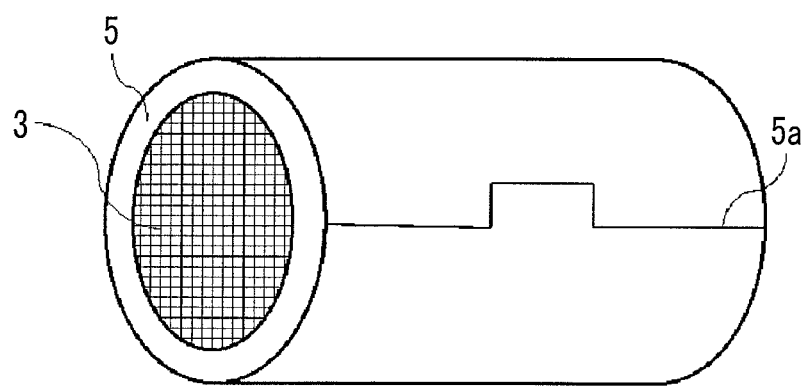
FIG. 2 is a diagram illustrating a first mat that is mounted.
Figure 3:
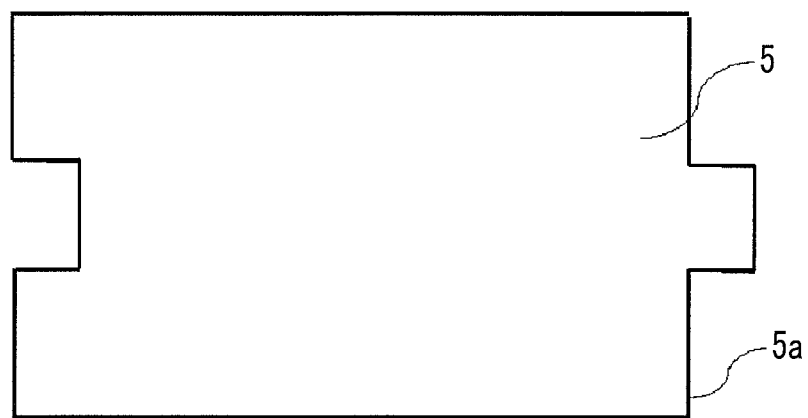
FIG. 3 is a development figure of the first mat.
Figure 4:
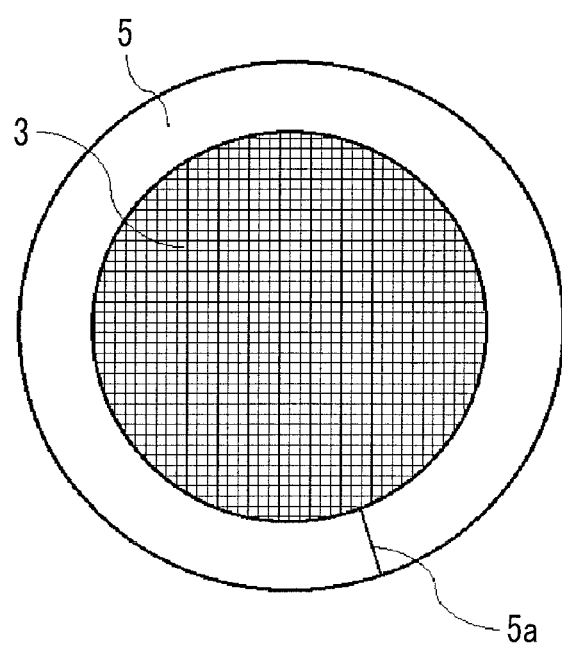
FIG. 4 is a sectional view of a downstream side catalyst and the first mat according to a first embodiment.

FIG. 2 is a diagram illustrating the first mat that is mounted. The first mat 5 is held to wrap around the downstream side catalyst 3, and thus necessarily has a joint. FIG. 3 is a development figure of the first mat. Although the joint has a projecting shape in the first embodiment, the disclosure is not limited thereto. Likewise, the second mat 6 is held to wrap around the electric heating catalyst 4 and has a joint that has a projecting shape. FIG. 4 is a sectional view of the downstream side catalyst 3 according to the first embodiment. In the first embodiment, a joint 5a of the first mat 5 is disposed in a place other than the vertically lowermost portion (such as a place 20° away from the vertically lowermost portion).

Moisture contained in exhaust gas is likely to condense in an exhaust pipe and accumulate downwards. Accordingly, water accumulation at the joint 5a of the first mat 5 can be suppressed by the joint 5a of the first mat 5 being disposed in a place other than the vertically lowermost portion, that is, by the joint 5a being disposed to be positioned above the vertically lowermost portion in the outer tube 2. As a result, connection of condensed water via the first mat 5 from the electric heating catalyst 4 to the exhaust pipe downstream of the downstream side catalyst 3 can be suppressed compared to a case where water accumulates at the joint 5a of the first mat 5. As a result, electric leakage path formation attributable to condensed water can be further suppressed.

Second Embodiment

Figure 5:
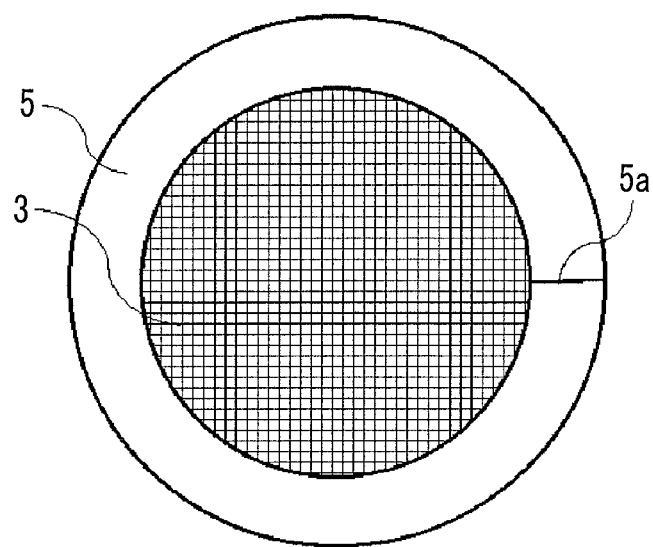
FIG. 5 is a sectional view of a downstream side catalyst and a first mat according to a second embodiment.

In the following description of a second embodiment, parts common to the first and second embodiments will not be described. FIG. 5 is a sectional view of the downstream side catalyst 3 according to the second embodiment. The exhaust gas control apparatus 1 is installed at an angle at which condensed water does not infiltrate into the downstream side catalyst 3. In other words, condensed water accumulates to the same extent as the thickness of the first mat 5 at most. In the second embodiment, the joint 5a of the first mat 5 is disposed in a place other than the region where the water accumulates, that is, in a place other than the vertically lower portion below the downstream side catalyst 3.

Condensed water may accumulate in the vertically lower portion below the downstream side catalyst 3. Accordingly, electric leakage path formation attributable to condensed water can be more reliably suppressed by the joint 5a of the first mat 5 being disposed in a place other than the vertically lower portion below the downstream side catalyst 3.

Third Embodiment

Figure 6:
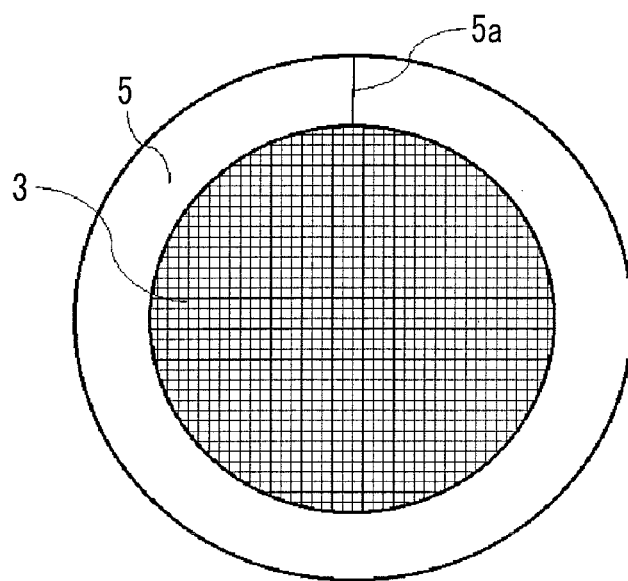
FIG. 6 is a sectional view of a downstream side catalyst and a first mat according to a third embodiment.

In the following description of a third embodiment, parts common to the first and third embodiments will not be described. FIG. 6 is a sectional view of the downstream side catalyst 3 according to the third embodiment. In the third embodiment, the joint 5a of the first mat 5 is disposed in the vertically uppermost portion in the outer tube.

Although condensed water does not accumulate in a place other than the vertically lower portion below the downstream side catalyst 3, the second mat 6 absorbs water, and thus condensed water may move upwards along the mat. Accordingly, electric leakage path formation attributable to condensed water can be more reliably suppressed by the joint 5a of the first mat 5 being disposed in the vertically uppermost portion in the outer tube.

Joint of Second Mat 6 Holding Electric Heating Catalyst 4

The joint of the second mat 6 holding the electric heating catalyst 4 is disposed in a place other than the vertically lowermost portion (such as a place 20° away from the vertically lowermost portion). Condensed water is most likely to accumulate in the vertically lowermost portion, and thus outflow of condensed water to the first mat 5 through the joint of the second mat 6 can be suppressed by the joint being disposed in a place other than the vertically lowermost portion. As a result, electric leakage path formation in the first mat 5 can be further suppressed. Although not particularly limited, it is more preferable that the joint of the second mat 6 is disposed in a place other than the vertically lower portion below the electric heating catalyst 4. Outflow of condensed water to the first mat 5 can be more reliably suppressed by the joint of the second mat 6 being disposed in a place other than the vertically lower portion.

Positional Relationship between Joint 5a of First Mat 5 and Joint of Second Mat 6

When the joint 5a of the first mat 5 and the joint of the second mat 6 are linearly disposed side by side, exhaust gas may pass through the joint 5a of the first mat 5 and the joint of the second mat 6 and emit hazardous substances without being controlled. Accordingly, it is desirable that the joint 5a of the first mat 5 and the joint of the second mat 6 are disposed shifted by at least a predetermined angle (such as 20°) without being linearly disposed side by side.

The above-described embodiments are merely an example for implementing the disclosure. Accordingly, the disclosure is not limited to the embodiments and can be changed and modified in various forms within the scope of the disclosure set forth in the claims.

What is claimed is:

1. An exhaust gas control apparatus disposed on an exhaust passage of an internal combustion engine and configured to control exhaust gas, the exhaust gas control apparatus comprising:
    an outer tube having an electrical insulation property connected to an exhaust pipe having an electrical conductive property;
    an electric heating catalyst positioned inside the outer tube; and
    a downstream side catalyst arranged downstream of the electric heating catalyst in an exhaust flow direction in the outer tube, the downstream side catalyst being held inside the outer tube via a first mat, wherein:
    a joint of the first mat is disposed in a position other than a vertically lowermost portion of the first mat in the outer tube,
    the electric heating catalyst is held in the exhaust passage via a second mat, and
    a joint of the second mat is disposed in a place other than a vertically lowermost portion of the second mat in the outer tube.

2. An exhaust gas control apparatus disposed on an exhaust passage of an internal combustion engine and configured to control exhaust gas, the exhaust gas control apparatus comprising:
    an outer tube having an electrical insulation property connected to an exhaust pipe having an electrical conductive property;
    an electric heating catalyst positioned inside the outer tube; and
    a downstream side catalyst arranged downstream of the electric heating catalyst in an exhaust flow direction in the outer tube, the downstream side catalyst being held inside the outer tube via a first mat, wherein:
    a joint of the first mat is disposed in a position other than a vertically lowermost portion of the first mat in the outer tube;
    the electric heating catalyst is held in the exhaust passage via a second mat,
    a joint of the second mat is disposed in a place other than a vertically lowermost portion of the second mat in the outer tube, and
    the joint of the first mat and the joint of the second mat are not linearly disposed side by side.

* * * * *